US012783919B2

(12) United States Patent
Bergstrom

(10) Patent No.: US 12,783,919 B2
(45) Date of Patent: Nov. 3, 2026

(54) MACHINE LEARNING FOR PREDICTIVE IN-FLIGHT ALERTS

(71) Applicant: THE BOEING COMPANY, Arlington, VA (US)

(72) Inventor: Trevor J. Bergstrom, Seattle, WA (US)

(73) Assignee: The Boeing Company, Arlington, VA (US)

( * ) Notice: Subject to any disclaimer, the term of this patent is extended or adjusted under 35 U.S.C. 154(b) by 212 days.

(21) Appl. No.: 18/171,548

(22) Filed: Feb. 20, 2023

(65) Prior Publication Data

US 2024/0282201 A1 Aug. 22, 2024

(51) Int. Cl.
*G08G 5/30* (2025.01)

(52) U.S. Cl.
CPC ...................................... *G08G 5/30* (2025.01)

(58) Field of Classification Search
CPC ..... G08G 5/003; G08G 5/0013; G08G 5/0052
See application file for complete search history.

(56) References Cited

U.S. PATENT DOCUMENTS 6,249,740 B1 * 6/2001 Ito ........................ G06Q 10/047 701/437
2013/0211632 A1 * 8/2013 Caule ..................... B64D 45/00 701/3
2018/0373246 A1 * 12/2018 Laughlin ................ G06Q 50/40
2019/0042748 A1 * 2/2019 Shabtai .................. G06N 20/00
2019/0228312 A1 * 7/2019 Andoni .................. G06N 3/088
2020/0012918 A1 * 1/2020 Malhotra ............. G06N 3/0455
2020/0097841 A1 * 3/2020 Petousis .............. H03M 7/6023
2020/0226205 A1 * 7/2020 Nookala .................. G06N 3/08
2020/0317365 A1 * 10/2020 Sherry ..................... G06N 7/01
2021/0020056 A1 * 1/2021 Chenchu .................. G08G 5/21
2022/0076583 A1 * 3/2022 Gu ........................... G08G 5/50
2022/0107640 A1 * 4/2022 Groden ...................... B64F 5/60
2024/0233560 A1 * 7/2024 Baldwin ................ G06N 20/00

OTHER PUBLICATIONS

Cour-Harbo, Quantifying risk of ground impact fatalities of power line inspection BVLOS flight with small unmanned aircraft, Jun. 2017, IEEE, pp. 1352-1356 (Year: 2017).*

* cited by examiner

*Primary Examiner* — Navid Z. Mehdizadeh
*Assistant Examiner* — Caitlin R McCleary
(74) *Attorney, Agent, or Firm* — Harrity & Harrity, LLP

(57) ABSTRACT

The present disclosure provides techniques for machine learning-based anomaly prediction. A set of flight data for a flight of an aircraft is accessed, and an embedding is generated by processing the set of flight data using an autoencoder machine learning model. A reconstruction error is generated based on the embedding using the autoencoder machine learning model. An anomaly measure is generated for the set of flight data by processing the embedding and the reconstruction error using an anomaly machine learning model. In response to determining that the anomaly measure satisfies one or more criteria, an alert is output.

20 Claims, 7 Drawing Sheets

MACHINE LEARNING FOR PREDICTIVE IN-FLIGHT ALERTS

FIELD

Aspects of the present disclosure relate to machine learning. More particularly, the present disclosure relates to machine learning to provide predictive in-flight alerts.

BACKGROUND

There are a variety of techniques and systems that can be used to track aircraft while in flight. One common approach includes each aircraft automatically determining and transmitting data such as its position, ground speed, altitude, and the like periodically. Indeed, some such techniques are required by various statutes and/or regulations. For example, Automatic Dependent Surveillance-Broadcast (ADS-B) is a technology in which the aircraft determines its position using satellite navigation or other sensors, and periodically broadcasts this data, enabling the aircraft to be tracked.

Additionally, aircraft occasionally encounter anomalies, while in flight, that cause them to diverge from their intended flight path (e.g., entering a diversion or holding pattern, such as due to inclement weather). Generally, these anomalies must be manually reported (e.g., by the pilots themselves) and/or manually identified by users (e.g., ground control) based on sensor data. There is a need for improved anomaly detection in aircraft flights.

SUMMARY

In one aspect of the present disclosure, a method is provided. The method includes: accessing a set of flight data for a flight of an aircraft; generating an embedding by processing the set of flight data using an autoencoder machine learning model; generating a reconstruction error based on the embedding using the autoencoder machine learning model; generating an anomaly measure for the set of flight data by processing the embedding and the reconstruction error using an anomaly machine learning model; and in response to determining that the anomaly measure satisfies one or more criteria, outputting an alert.

In one aspect, in combination with any example method above or below, the set of flight data comprises a sequence of records, each respective record in the sequence of records comprising data indicating: (i) a respective longitude of the aircraft, (ii) a respective latitude of the aircraft, (iii) a respective altitude of the aircraft, and (iv) a respective ground speed of the aircraft.

In one aspect, in combination with any example method above or below, the method further includes augmenting the set of flight data by generating one or more additional records, comprising interpolating the data in each record of the sequence of records.

In one aspect, in combination with any example method above or below, the method further includes normalizing the set of flight data based on a coordinate system, wherein an origin location of the flight of the aircraft is normalized to a first defined point in the coordinate system and a destination location of the flight of the aircraft is normalized to a second defined point in the coordinate system.

In one aspect, in combination with any example method above or below, the autoencoder machine learning model comprises an encoder portion and a decoder portion, and generating the embedding comprises processing the set of flight data using the encoder portion.

In one aspect, in combination with any example method above or below, generating the reconstruction error comprises: generating a reconstructed set of flight data by processing the embedding using the decoder portion; and quantifying differences between the set of flight data and the reconstructed set of flight data.

In one aspect, in combination with any example method above or below, the anomaly measure indicates at least one of: (i) a probability that the aircraft is in a diversion, (ii) a probability that the aircraft is in a holding pattern, or (iii) a probability that the aircraft is in a rapid descent.

In one aspect, in combination with any example method above or below, the autoencoder machine learning model was trained based on training sets of flight data, wherein the training sets of flight data correspond to non-anomalous flights of one or more aircraft.

In one aspect, in combination with any example method above or below, the anomaly machine learning model was trained based on training sets of flight data, wherein the training sets of flight data correspond to both (i) non-anomalous flights of one or more aircraft and (ii) anomalous flights of one or more aircraft.

The present disclosure provides a system in one aspect. The system includes a processor, a memory storage device including instructions that when executed by the processor enable performance of an operation in accordance with any combination of the above methods.

The present disclosure provides a computer program product in one aspect, the computer program product including a computer-readable storage medium having computer-readable program code embodied therewith, the computer-readable program code executable by one or more computer processors to perform an operation in accordance with any combination of the above methods.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
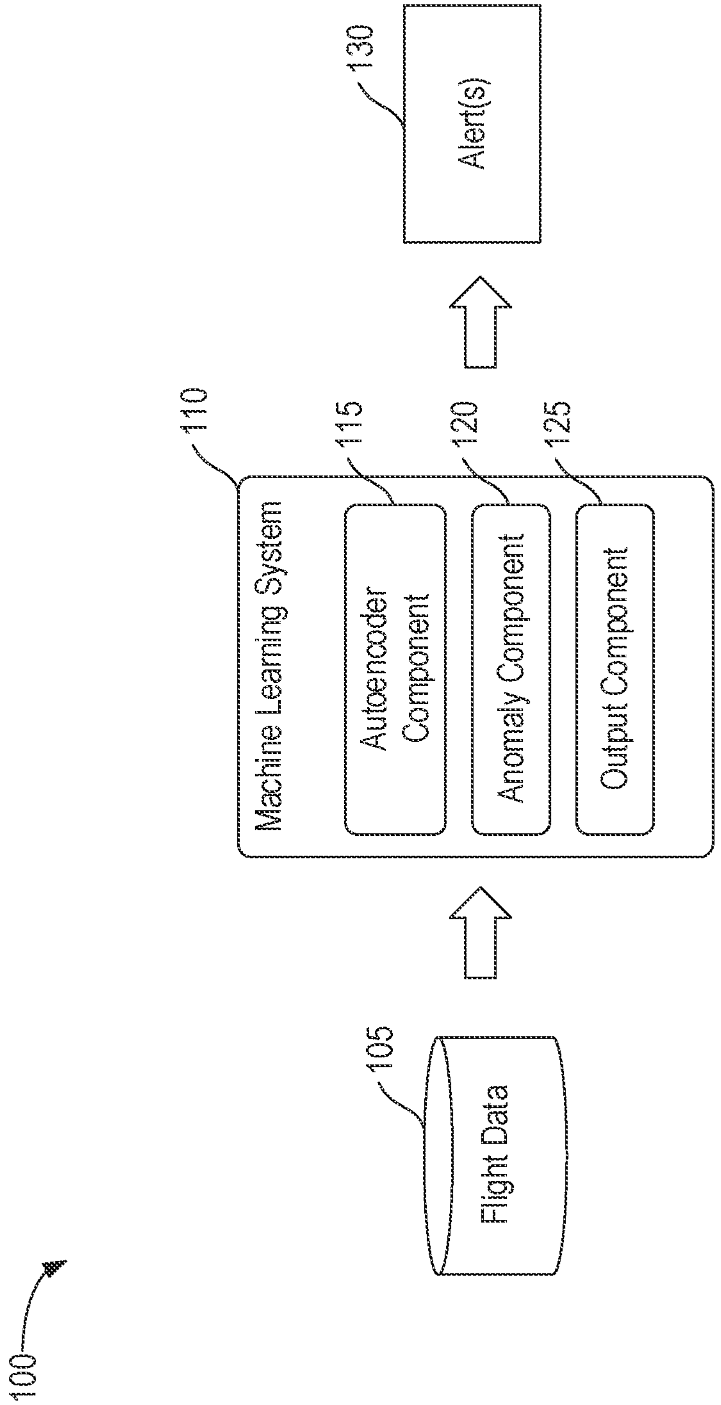
FIG. 1 depicts a workflow for generating alerts based on flight data using machine learning, according to one or more aspects of the present disclosure.

The present disclosure relates to machine learning for identifying in-flight anomaly alerts.

In some embodiments, flight data for an aircraft in flight (e.g., ADS-B data) can be accessed, preprocessed, and/or evaluated using machine learning to generate an anomaly measure indicating the probability that the aircraft has encountered an anomaly. In some embodiments, the flight data includes a sequence of records, each record including information relating to the positioning of the aircraft at a corresponding time. By transmitting a new location record periodically, the aircraft indicates its updated location. In some embodiments, by evaluating such records in sequence, computing systems can make flight predictions based on the track. For example, each record in the flight data may include information such as the longitude of the aircraft, the latitude of the aircraft, the altitude of the aircraft, the ground speed of the aircraft, and the like.

As used herein, the term "aircraft" can generally include any craft capable of flight (whether crewed or remote-operated), including airplanes, helicopters, gliders, drones, balloons, airships, and the like. Additionally, as used herein, "anomaly" can generally include any deviation from an intended flight plan, including the aircraft diverting away from the planned flight path, entering a holding pattern, entering a rapid descent, loss of engine power, loss of cabin pressure, irregular maneuvers, bird strikes, and the like. In some aspects, the machine learning models can similarly be used to predict other events, such as predicting landing time, predicting a new planned destination (e.g., if the aircraft is diverting), and the like.

In some embodiments, flight data can undergo various preprocessing to facilitate its use with one or more machine learning models. For example, the flight data may be normalized based on a coordinate system (e.g., a two or three dimensional Cartesian coordinate system) to place the flight origin (e.g., the departure airport) at a first defined point (e.g., at (0,0)) and the planned destination (e.g., the arrival airport) at a second defined point (e.g., at (1,1)). In some embodiments, the preprocessing can include augmenting, resampling, or interpolating the data. For example, if the flight data records may be transmitted periodically (e.g., every 5 minutes, every 10 minutes, and the like), the system may linearly interpolate the data to generate additional records between received records (e.g., to generate a record for each minute). That is, the augmented flight data may include a first real record (e.g., for time t=0), one or more generated or interpolated records (e.g., for times t=1, t=2, t=3, and t=4), and a second real record (e.g., for time t=5), where the values in the generated records are generated by interpolating between the values in the first real record at time t=0 and the second real record at time t=5.

In some embodiments, all or a subset of the flight data is then processed by an encoder machine learning model (e.g., an autoencoder) to generate an embedding (also referred to in some aspects as a latent space embedding). For example, in one aspect, flight data from a defined window of time (e.g., a ten or twenty minute window) can be used to generate the embeddings. In some aspects, these embeddings can be used as input to a second machine learning model (e.g., a classifier or other model) to generate an output (e.g., a classification of the data as indicating an anomaly or not, a continuous score indicating the probability of an anomaly, and the like).

In some embodiments, the embeddings can also be processed by a second portion of the autoencoder (e.g., using a decoder portion of the model) to generate reconstructed flight data. This reconstructed flight data can then be compared with the original input flight data to generate a reconstruction loss or error (e.g., using mean absolute error (MAE), mean squared error (MSE), and the like) to quantify the difference between the (potentially preprocessed) input flight data and the reconstructed flight data. In some embodiments, this reconstruction error is also used as input (alongside the embeddings) to the anomaly prediction model, as discussed in more detail below.

Generally, these anomaly predictions can be used to drive a wide variety of operations and actions. For example, in response to detecting or predicting an anomaly (such as a diversion), various actions can be taken such as triggering investigation, contacting the aircraft to ask for an explanation, alerting or reconfiguring ground support based on the diversion (e.g., deploying support at the new destination and/or withdrawing or updating the team at the original destination, allocating resources such as additional fuel in various locations, etc.), and the like.

For example, in some embodiments, the predicted anomalies can be displayed to support employees, and fleet monitors may begin assessing the current and/or historical fault state of the aircraft. Similarly, controllers may contact field service representatives and/or airline maintenance operations control (MOC) directly.

FIG. 1 depicts a workflow 100 for generating alerts based on flight data using machine learning, according to one or more aspects of the present disclosure.

In the illustrated example, flight data 105 is accessed by a machine learning system 110 to generate alert(s) 130. As used herein, "accessing" data can generally include receiving, retrieving, requesting, or otherwise gaining access to the data. In some aspects, as discussed above, the flight data 105 comprises a sequence of records indicating location and/or movement information for one or more aircraft, such as their latitude, longitude, altitude, ground speed, and the like. In some embodiments, the flight data 105 includes or is derived from ADS-B data. Although machine learning system 110 is depicted as discrete system for conceptual clarity, in some aspects, the operations of the machine learning system 110 may be combined or distributed across any number of systems, and may be implemented using hardware, software, or a combination of hardware and software.

In the illustrated example, the machine learning system 110 includes an autoencoder component 115, an anomaly component 120, and an output component 125. Although depicted as discrete components for conceptual clarity, in some aspects, the operations of the depicted components (and others not illustrated) may be combined or distributed across any number of components. The autoencoder component 115, anomaly component 120, and output component 125 can generally be implemented using hardware, software, or a combination of hardware and software.

In an embodiment, the autoencoder component 115 can generally be used to generate embeddings and/or reconstruction errors based on the input flight data 105. In some embodiments, as discussed above, the flight data 105 may undergo one or more preprocessing operations (e.g., by a preprocessing component, not depicted in the illustrated example) prior to being evaluated by the autoencoder component 115. For example, the flight data 105 may be normalized to a coordinate system, augmented via interpolation, and the like.

In some aspects, the autoencoder component 115 uses an autoencoder machine learning model, including an encoder portion and a decoder portion. The encoder portion can be used to generate an embedding based on a sequence of flight data 105 (e.g., covering a twenty minute window), and the decoder portion can be used to generate reconstructed flight data based on the embedding. In some embodiments, the autoencoder component 115 can then generate a reconstruction loss based on comparing the reconstructed flight data and the original (potentially pre-processed) flight data 105.

Generally, the particular architecture of the autoencoder machine learning model may vary depending on the particular implementation. For example, the autoencoder machine learning model may be a neural network, such as a recurrent neural network (e.g., a long short-term memory (LSTM) model).

The anomaly component 120 can generally be used to generate an anomaly measure based on one or more outputs of the autoencoder component 115. For example, in some embodiments, the anomaly component 120 uses an anomaly machine learning model to process the generated embeddings and/or reconstruction loss in order to generate the anomaly measure. The anomaly measure may generally include a continuous value or score (e.g., between zero and one) and/or a classification, such as a binary classification indicating whether the flight data 105 indicates an anomaly, a categorical classification indicating what type of anomaly is predicted (if any), and the like. In at least one embodiment, the anomaly component 120 uses a discrete anomaly model for each type of anomaly. For example, the anomaly component 120 may process the embeddings and/or reconstruction error using a first model to generate a score (e.g., between zero and one) indicating the probability that the aircraft is diverting, using a second model to generate a score indicating the probability that the aircraft is in a holding pattern, and the like.

Generally, the particular architecture of the anomaly machine learning model(s) may vary depending on the particular implementation. For example, the anomaly machine learning model(s) may include neural network(s), random forest models, and the like.

In the illustrated example, the output component 125 may evaluate the generated anomaly measure(s) to determine whether they satisfy one or more criteria (e.g., thresholds) in order to dynamically generate alerts 130. For example, if the anomaly measure exceeds a first threshold (e.g., greater than a defined minimum value), the output component 125 may generate an alert 130 or other output to a set of users (e.g., the pilots of the aircraft, to request confirmation or detail as to what is happening). In some aspects, if a second (higher) threshold is satisfied, the output component 125 may generate an alert 130 or other output to another set of users (e.g., to ground control staff). In embodiments, any number and variety of criteria (e.g., thresholds) may be used.

The alerts 130 can generally include a wide variety of outputs, including informational alerts (e.g., messages, pop-ups, alarms, lights, sounds, and the like) for one or more users via one or more devices. For example, the alert(s) 130 may be provided to the aircraft crew, to ground crew, to air traffic control, and the like. In some embodiments, the alerts 130 can additionally or alternatively include actions (which may be automatically performed, or may be output as suggestions). For example, in response to predicting that an aircraft is diverting to a new airport, the output component 125 may alert ground crew at the new airport to expect the flight, trigger reallocation of resources (e.g., fuel) and/or services (e.g., waste offloading, baggage handling, and the like) at the new destination and/or original destination.

Figure 2:
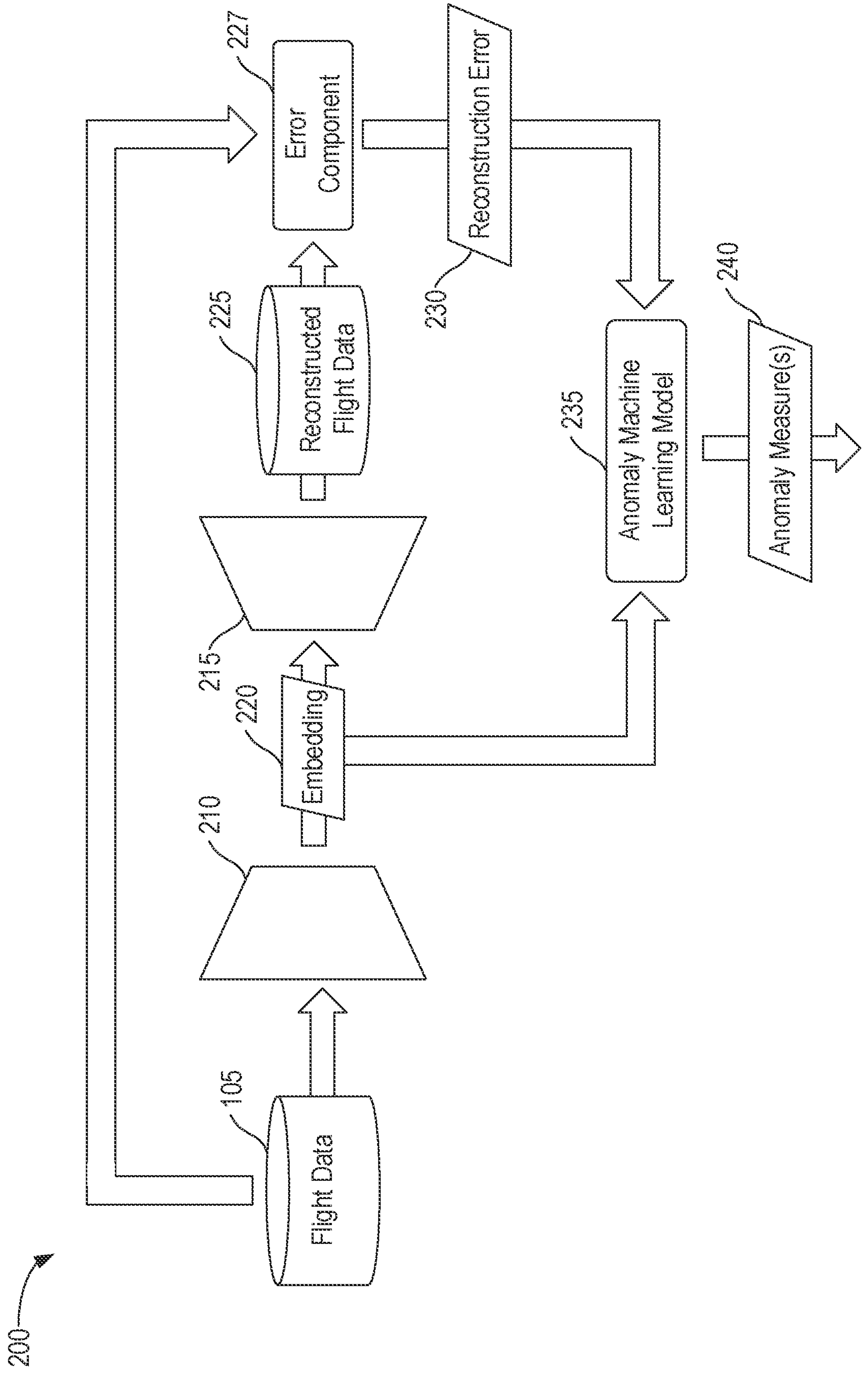
FIG. 2 depicts a workflow for generating anomaly measures using machine learning, according to one or more aspects of the present disclosure.

FIG. 2 depicts a workflow 200 for generating anomaly measures using machine learning, according to one or more aspects of the present disclosure. In some embodiments, the workflow 200 provides additional detail for the operations of the autoencoder component 115 and/or anomaly component 120 of FIG. 1.

In the illustrated example, flight data 105 is processed by an encoder 210 to generate an embedding 220. As discussed above, in some embodiments the encoder 210 processes a subset of the flight data 105 corresponding to a defined window (e.g., the last ten minutes) to generate embedding 220. In at least one embodiment, the encoder 210 can be used to process flight data 105 using a sliding window, such that at each respective point in time (e.g., each minute) a corresponding embedding 220 is generated based on data from the defined window (e.g., the last ten minutes prior to the respective point in time).

The encoder 210 generally corresponds to all or a portion of a machine learning model. For example, the encoder 210 may comprise one or more layers of a neural network (e.g., an LSTM model). As illustrated, the embeddings 220 are provided to a decoder 215 to generate reconstructed flight data 225. The decoder 215 similarly corresponds to all or a portion of a machine learning model. For example, the decoder 215 may comprise one or more layers of a neural network (e.g., an LSTM model). In some embodiments, the encoder 210 and decoder 215 may generally be referred to collectively as an autoencoder machine learning model.

In the illustrated workflow 200, the reconstructed flight data 225 is provided, along with the flight data 105, to an error component 227 that generates a reconstruction error 230. For example, the error component 227 may use the MSE, MAE, or any other difference function to compare the flight data 105 and any reconstructed flight data 225 in order to generate the reconstruction error 230. In some embodiments, the error component 227 corresponds to or is included in the autoencoder component 115 of FIG. 1. In some embodiments, as discussed below in more detail, the reconstruction error 230 may be used to refine or update the parameters (e.g., weights) of the encoder 210 and decoder 215 during a training phase. For example, using backpropagation, the error component 227 may generate gradients to update the parameters of the autoencoder model, beginning from the final layer and moving towards the first. In this way, the autoencoder learns to generate more accurate reconstructed flight data 225, which similarly forces the model to learn to generate more effective embeddings 220 that accurately represent the flight data 105.

In the depicted workflow 200, the embedding 220 and reconstruction error 230 are provided to one or more anomaly machine learning models 235 to generate one or more anomaly measures 240. As discussed above, the anomaly machine learning model(s) 235 can generally be implemented using a variety of machine learning architectures, including random forests, neural networks, and the like. In some embodiments, during a training phase, the anomaly machine learning models 235 can be refined using supervised learning (e.g., based on a label indicating whether the flight data 105 reflects an anomaly such as a diversion), as discussed in more detail below.

As discussed above, the anomaly measures 240 can generally include continuous value(s) (e.g., scores indicating the probability that an anomaly is present), classifications, and the like. In some aspects, as discussed above, the workflow 200 can be used to generate anomaly measures repeatedly and/or periodically (e.g., every minute). In this way, for each minute of flight, the workflow 200 can be used to generate an anomaly measure 240 based on the last few minutes of the flight. This can allow the system to generate a sequence of anomaly measures, enabling rapid identification or prediction of anomalies (such as diversions) as they occur.

Figure 3:
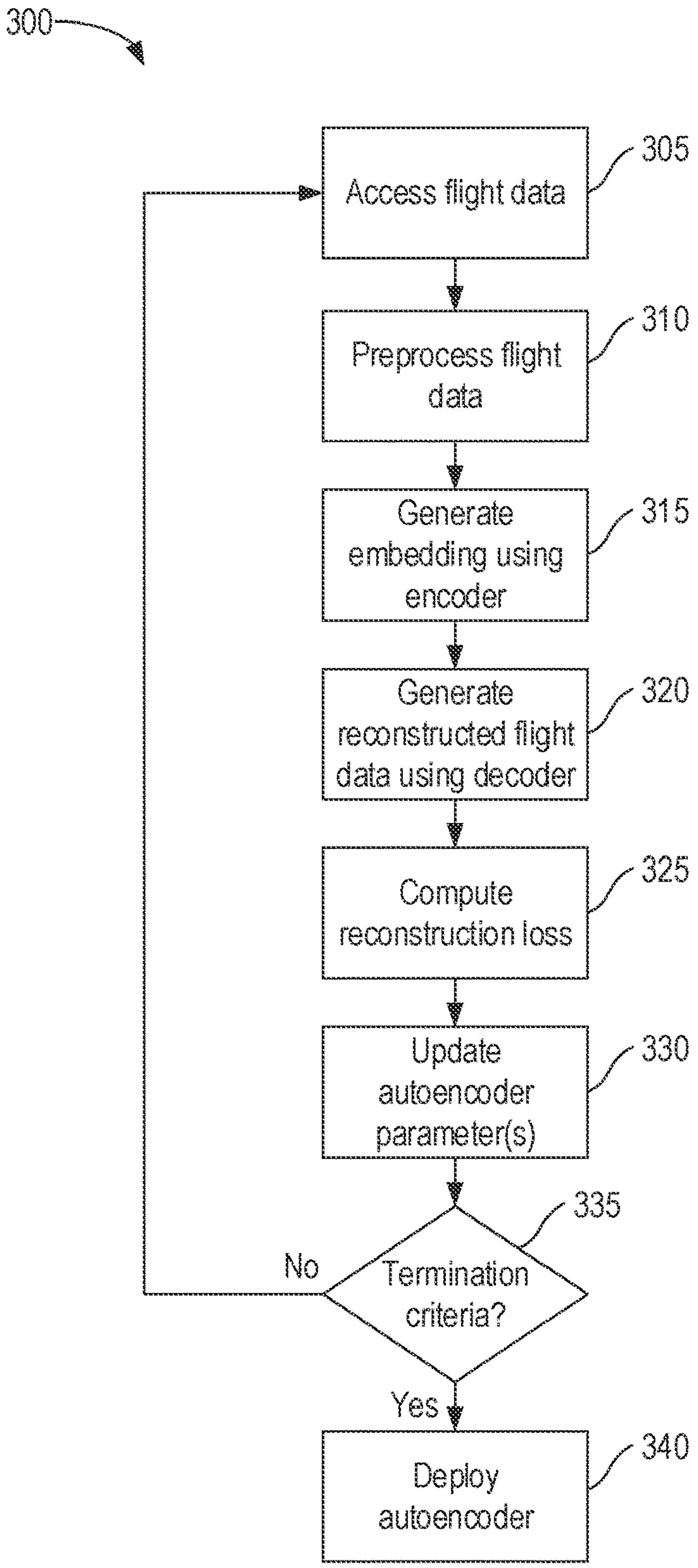
FIG. 3 is a flow diagram depicting an example method for training an autoencoder model to perform anomaly detection based on flight data, according to one or more aspects of the present disclosure.

FIG. 3 is a flow diagram depicting an example method 300 for training an autoencoder model to perform anomaly detection based on flight data, according to one or more aspects of the present disclosure. In some embodiments, the method 300 is performed by a machine learning system, such as a training system. In some embodiments, the training system corresponds to the machine learning system 110 of FIG. 1. In other embodiments, the method 300 is performed by a dedicated training system. That is, in some embodiments, one or more training systems may be used to train the models, and one or more separate inferencing systems use the trained models to generate anomaly predictions. In other embodiments, a single system may perform both training and inferencing.

At block 305, the training system accesses flight data (e.g., flight data 105 of FIGS. 1 and 2). In an embodiment, as discussed above, the flight data can include information relating to the flight of an aircraft, such as its location at one or more points in time, its altitude at one or more points in time, its ground speed at one or more points in time, and the like. In at least one embodiment, the flight data is ADS-B data.

At block 310, the training system can optionally preprocess the flight data. For example, as discussed above, the training system may normalize the data using rotation and/or translation matrices to align the departure location with a first point in a coordinate system (e.g., the origin) and the intended arrival location with a second point (e.g., at (1,1)). That is, the location indicated for each point in the flight data (e.g., in latitude and longitude) may be normalized based on the rotation and/or scaling used to align the origin and destination points with the defined points in the coordinate system.

As another example, the training system may augment or resample the flight data, such as by using interpolation between actual records to generate augmented records, as discussed above. For example, if the flight data includes a first record at a first time and a second record at a second time five minutes later, the training system may generate one or more artificial records for these intervening five minutes by linearly interpolating between the first and second records. In some aspects, preprocessing the flight data can further include delineating it into sets based on a defined window length (e.g., for a sliding window).

At block 315, the training system generates an embedding (e.g., embedding 220 of FIG. 2) by processing some or all of the (potentially preprocessed) flight data (e.g., records for the last twenty minutes) using an encoder portion of an autoencoder machine learning model (e.g., encoder 210 of FIG. 2), as discussed above.

At block 320, the training system generates reconstructed flight data (e.g., reconstructed flight data 225 of FIG. 2) by processing the embedding using a decoder portion of the autoencoder machine learning model (e.g., decoder 215 of FIG. 2), as discussed above. In some aspects, this reconstructed data may be relatively inaccurate early in the training process. For example, the autoencoder may be instantiated using randomized parameters (e.g., random weight values), resulting in generally random embeddings and reconstructions. During training, as these parameters are updated, the embeddings and reconstructions tend to improve substantially.

At block 325, the training system computes a reconstruction loss (e.g., reconstruction error 230 of FIG. 2) based on the (preprocessed) flight data and the reconstructed flight data. For example, as discussed above, the training system may compute the MSE or MAE between the autoencoder's input flight data and the output reconstructed flight data.

At block 330, the training system updates one or more autoencoder parameters based on the reconstruction loss (e.g., using backpropagation). In the illustrated example, the training system refines the model sequentially for each batch of flight data (e.g., each twenty minute window), such as by using stochastic gradient descent. In some embodiments, the training system may alternatively refine the model using batches of data, such as using batch gradient descent.

At block 335, the training system determines whether one or more termination criteria are satisfied. The termination criteria can generally correspond to a wide variety of criteria, such as a maximum number of training epochs, a maximum amount of time and/or computational resources spent training, determining whether any additional flight data remains for training, and the like. If the criteria are not met, the method 300 returns to block 305 to continue training by accessing new flight data (which may include data corresponding to a new flight, or a new subset of data from the same flight). If the training system determines that the termination criteria are met, the method 300 continues to block 340, where the training system deploys the autoencoder for inferencing (e.g., locally, or to a dedicated inferencing system).

In this way, in some aspects, the training system can train the autoencoder using self-supervision (e.g., using unlabeled flight data that has not been annotated to indicate the type of anomaly present, if any). In some embodiments, the training system uses training flight data corresponding to non-anomalous flights only. That is, the autoencoder may be trained using training data from non-anomalous flights, where the training data excludes or does not include data from any flights where an anomaly occurred (or, in the alternative, includes some data from anomalous flights, but includes only the portions of data from the non-anomalous portions of the flight and excludes the data corresponding to the anomalous portions of such flights).

In an embodiment, by training only on non-anomalous data, the autoencoder learns to generate effective embeddings for nominal flights, which can help improve the anomaly detection during subsequent inferencing.

Figure 4:
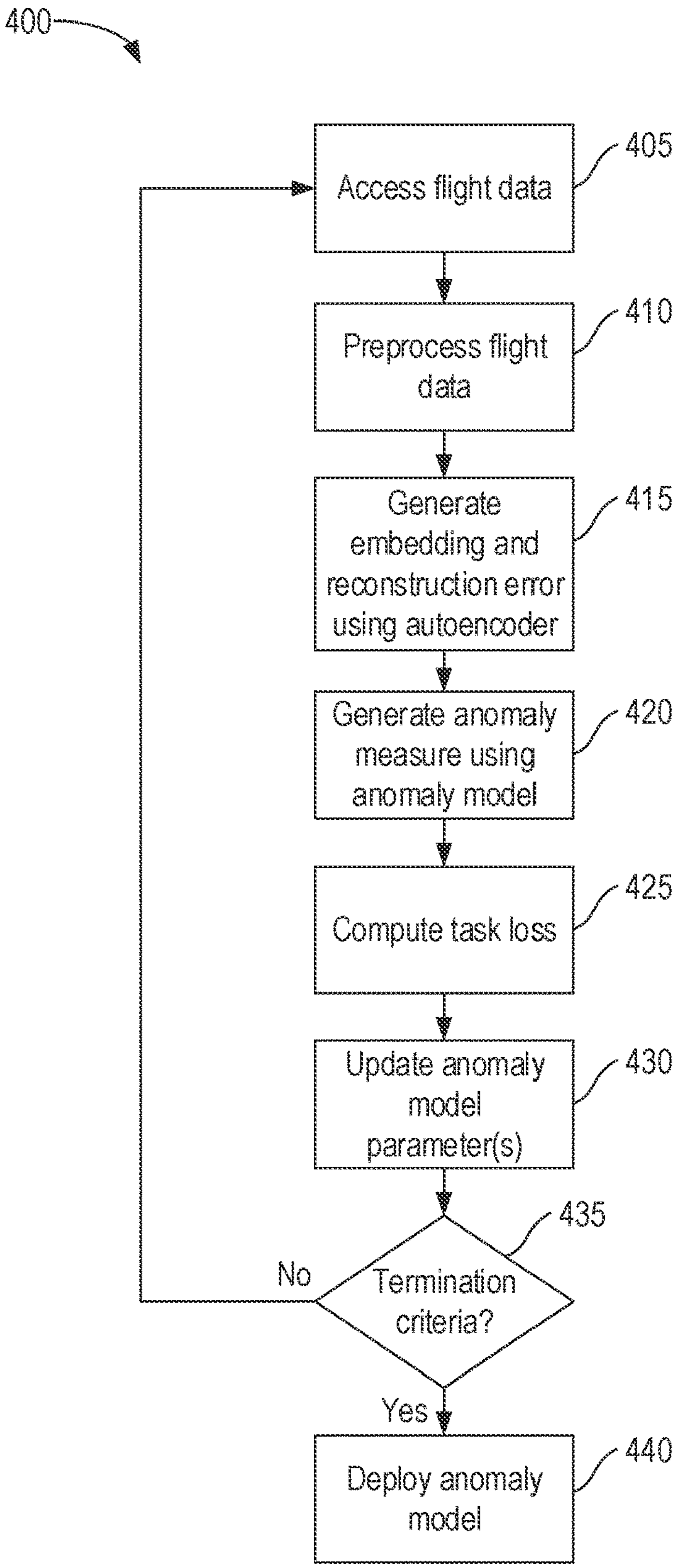
FIG. 4 is a flow diagram depicting an example method for training an anomaly model to perform anomaly detection based on flight data, according to one or more aspects of the present disclosure.

FIG. 4 is a flow diagram depicting an example method 400 for training an anomaly model to perform anomaly detection based on flight data, according to one or more aspects of the present disclosure. In some embodiments, the method 400 is performed by a machine learning system, such as a training system. In some embodiments, the training system corresponds to the machine learning system 110 of FIG. 1. In other embodiments, the method 400 is performed by a dedicated training system. That is, in some embodiments, one or more training systems may be used to train the models, and one or more separate inferencing systems use the trained models to generate anomaly predictions. In other embodiments, a single system may perform both training and inferencing. Similarly, in some embodiments, a single training system may train both the autoencoder model and the anomaly model. In other embodiments, separate training systems may train each model.

In some embodiments, the method 400 may be used to train the anomaly model while the autoencoder model is being trained. In some embodiments, the autoencoder model can be pre trained or trained first. In one such embodiment, once the autoencoder is trained, the anomaly model can be trained.

At block 405, the training system accesses flight data (e.g., flight data 105 of FIGS. 1 and 2). In an embodiment, as discussed above, the flight data can include information relating to the flight of an aircraft, such as its location at one or more points in time, its altitude at one or more points in time, its ground speed at one or more points in time, and the like. In at least one embodiment, the flight data is ADS-B data. In some aspects, the training flight data accessed at block 405 may correspond to or include the flight data used to train the autoencoder, as discussed above. In some embodiments, even if the autoencoder is trained using only non-anomalous data, the anomaly model may be trained using a combination of anomalous data and non-anomalous data in order to improve its functioning.

At block 410, the training system can optionally preprocess the flight data, as discussed above, the training system may normalize the data to align the departure location and arrival location with defined points in a coordinate system, resample or augment the data to generate augmented records, and the like.

At block 415, the training system generates an embedding (e.g., embedding 220 of FIG. 2) by processing some or all of the (potentially preprocessed) flight data (e.g., records for the last twenty minutes) using an encoder portion of an autoencoder machine learning model (e.g., encoder 210 of FIG. 2), as discussed above. Additionally, at block 415, the training system generates reconstructed flight data (e.g., reconstructed flight data 225 of FIG. 2) by processing the embedding using a decoder portion of the autoencoder (e.g., decoder 215 of FIG. 2), and generates a reconstruction loss (e.g., reconstruction error 230 of FIG. 2) based on comparing the flight data and the reconstructed flight data, as discussed above.

At block 420, the training system generates an anomaly measure (e.g., anomaly measure 240 of FIG. 2) by processing the embedding and/or reconstruction error using an anomaly machine learning model (e.g., anomaly machine learning model 235 of FIG. 2).

At block 425, the training system computes a task loss for the anomaly model based on the anomaly measure and a ground-truth label of the flight data. For example, the training data label may indicate whether the flight data represents an anomaly (e.g., a diversion, a holding pattern, a rapid descent, and the like). In some embodiments, the label indicates whether the overall flight included an anomaly. In some embodiments, the training label further indicates when the anomaly (if any) occurred. For example, the flight data may include a label for each record indicating whether the flight was anomalous at the time corresponding to that record.

In some embodiments, in addition to indicating whether an anomaly was occurring, the label can indicate the type of anomaly. This can allow the anomaly model to learn to predict multiple types of anomalies. That is, the anomaly model may learn to output a set of measures or scores, each indicating the probability that a corresponding anomaly is occurring. In some embodiments, however, a separate anomaly model is trained for each type of anomaly.

Generally, the task loss can be computed using a wide variety of techniques and operations, such as cross-entropy, MSE, MAE, and the like, depending on the particular implementation.

At block 430, the training system updates one or more anomaly model parameters based on the task loss (e.g., using backpropagation). In the illustrated example, the training system refines the anomaly model sequentially for each batch of flight data (e.g., each twenty minute window), such as by using stochastic gradient descent. In some embodiments, the training system may alternatively refine the model using batches of data, such as using batch gradient descent.

At block 435, the training system determines whether one or more termination criteria are satisfied. The termination criteria can generally correspond to a wide variety of criteria, such as a maximum number of training epochs, a maximum amount of time and/or computational resources spent training, determining whether any additional flight data remains for training, and the like. If the criteria are not met, the method 400 returns to block 405 to continue training by accessing new flight data (which may include data corresponding to a new flight, or a new subset of data from the same flight). If the training system determines that the termination criteria are met, the method 400 continues to block 440, where the training system deploys the anomaly model for inferencing (e.g., locally, or to a dedicated inferencing system).

In this way, in some aspects, the training system can train the anomaly model using supervised learning (e.g., using labeled flight data that has been annotated to indicate whether an anomaly is present and/or the type of anomaly present, if any). In some embodiments, to train the anomaly model, the training system uses training flight data corresponding to anomalous flights as well as non-anomalous flights. That is, while the autoencoder may be trained using non-anomalous training data only, the anomaly model may be trained using both anomalous data and non-anomalous data.

Figure 5:
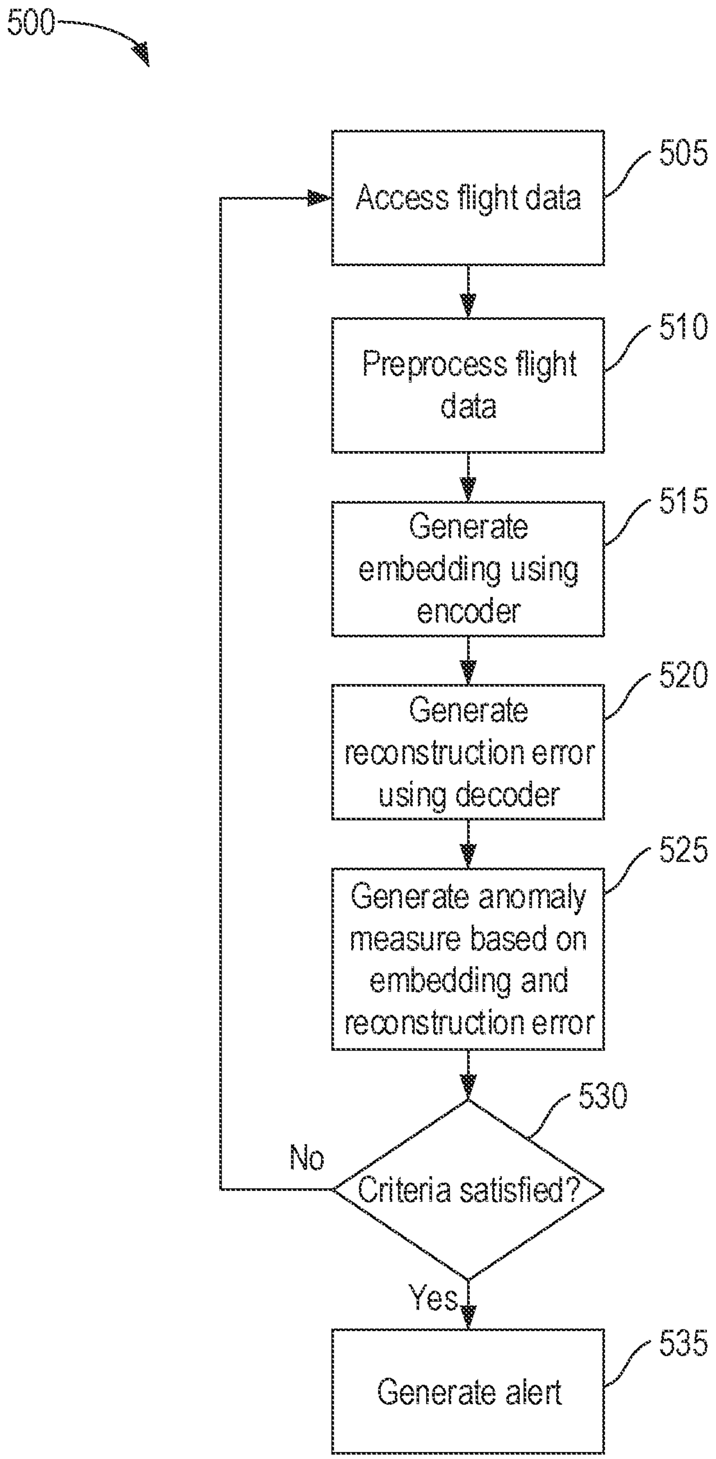
FIG. 5 is a flow diagram depicting an example method for performing anomaly detection using machine learning, according to one or more aspects of the present disclosure.

FIG. 5 is a flow diagram depicting an example method 500 for performing anomaly detection using machine learning, according to one or more aspects of the present disclosure. In some embodiments, the method 500 is performed by a machine learning system, such as an inferencing system. In some embodiments, the inferencing system corresponds to the machine learning system 110 of FIG. 1. In some embodiments, one or more training systems may be used to train the models, and one or more separate inferencing systems use the trained models to generate anomaly predictions. In other embodiments, a single system may perform both training and inferencing.

At block 505, the inferencing system accesses flight data (e.g., flight data 105 of FIGS. 1 and 2). In an embodiment, as discussed above, the flight data can include information relating to the flight of an aircraft, such as its location at one or more points in time, its altitude at one or more points in time, its ground speed at one or more points in time, and the like. In at least one embodiment, the flight data is ADS-B data.

At block 510, the inferencing system can optionally preprocess the flight data, as discussed above, the inferencing system may normalize the data to align the departure location and arrival location with defined points in a coordinate system, resample or augment the data to generate augmented records, and the like.

At block 515, the inferencing system generates an embedding (e.g., embedding 220 of FIG. 2) by processing some or all of the (potentially preprocessed) flight data (e.g., records for the last twenty minutes) using an encoder portion of an autoencoder machine learning model (e.g., encoder 210 of FIG. 2), as discussed above.

At block 520, the inferencing system generates reconstructed flight data (e.g., reconstructed flight data 225 of FIG. 2) by processing the embedding using a decoder portion of the autoencoder machine learning model (e.g., decoder 215 of FIG. 2), as discussed above, and generates a reconstruction error (e.g., reconstruction error 230 of FIG. 2)

based on the (preprocessed) flight data and the reconstructed flight data. For example, as discussed above, the inferencing system may compute the MSE or MAE between the autoencoder's input flight data and the output reconstructed flight data.

At block 525, the inferencing system generates an anomaly measure (e.g., anomaly measure 240 of FIG. 2) by processing the embedding and/or reconstruction error using an anomaly machine learning model (e.g., anomaly machine learning model 235 of FIG. 2), as discussed above. In some aspects, as discussed above, the inferencing system may generate multiple anomaly measures using multiple models (e.g., one for each type of anomaly).

At block 530, the inferencing system determines whether one or more alert or anomaly criteria are satisfied. The anomaly criteria can generally correspond to a wide variety of criteria, such as one or more threshold scores, determining whether the anomaly measure indicates one or more specific types of anomaly, and the like. Generally, the inferencing system can take a wide variety of actions depending on how probable an anomaly is (e.g., the value of the generated score) and/or what specific type of anomaly is predicted.

If the criteria are not met, the method 500 returns to block 505 to continue evaluating new flight data (which may include data corresponding to a new flight, or a new subset of data from the same flight). If the inferencing system determines that the anomaly criteria are met, the method 500 continues to block 535, where the inferencing system generates one or more alerts and/or takes other actions (e.g., alerts 130 of FIG. 1) based on the anomaly measure, as discussed above.

As discussed above, the alerts 130 can generally include a wide variety of outputs, including informational alerts automated reallocation of resources, and the like.

Figure 6:
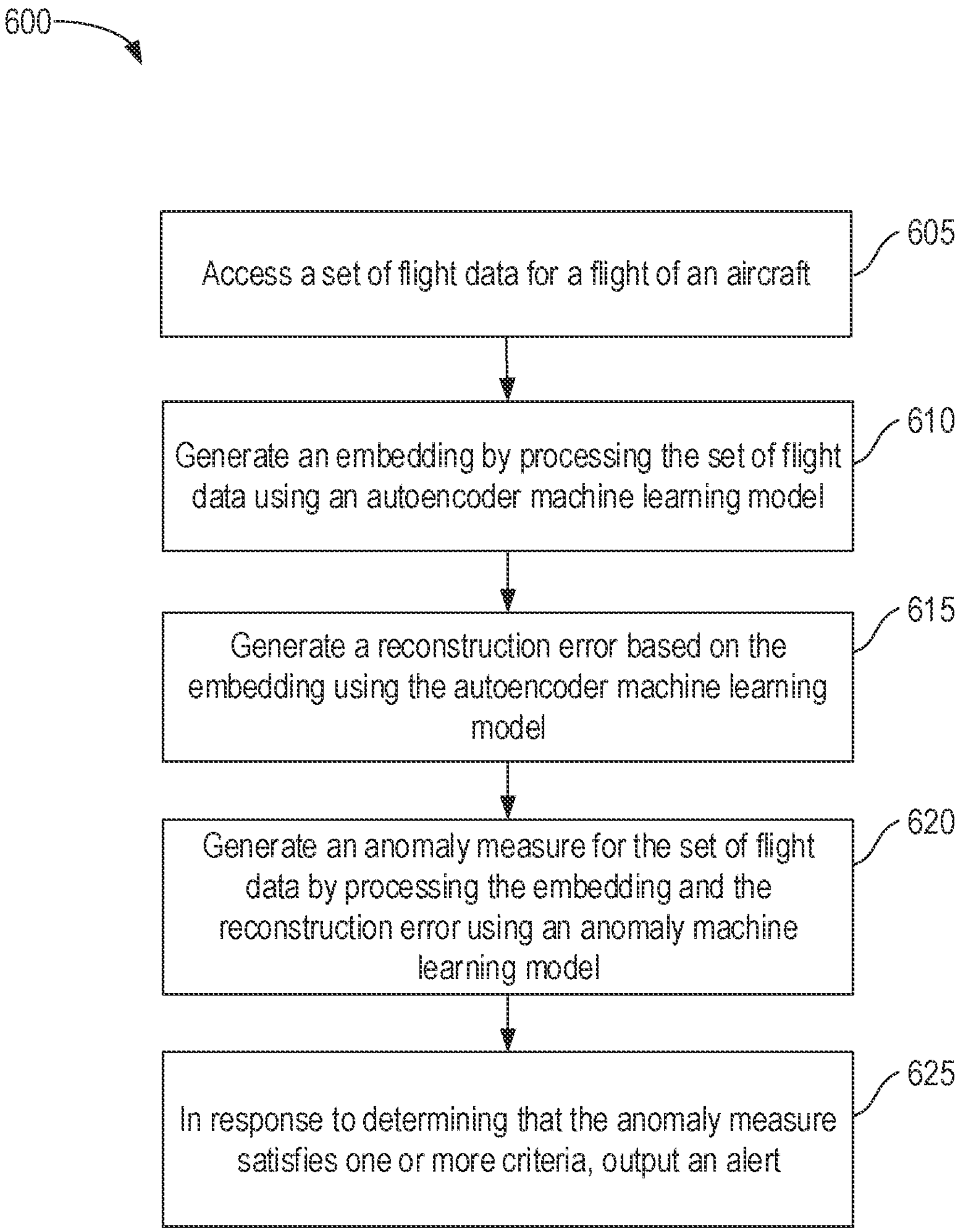
FIG. 6 is a flow diagram depicting an example method for generating alerts using machine learning, according to one or more aspects of the present disclosure.

FIG. 6 is a flow diagram depicting an example method 600 for generating alerts using machine learning, according to one or more aspects of the present disclosure. In some embodiments, the method 600 is performed by a machine learning system, such as the machine learning system 110 of FIG. 1.

At block 605, a set of flight data (e.g., flight data 105 of FIGS. 1 and 2) for a flight of an aircraft is accessed.

At block 610, an embedding (e.g., embedding 220 of FIG. 2) is generated by processing the set of flight data using an autoencoder machine learning model (e.g., using encoder 210 of FIG. 2).

At block 615, a reconstruction error (e.g., reconstruction error 230 of FIG. 2) is generated based on the embedding using the autoencoder machine learning model (e.g., using the decoder 215 of FIG. 2).

At block 620, an anomaly measure (e.g., anomaly measure 240 of FIG. 2) is generated for the set of flight data by processing the embedding and the reconstruction error using an anomaly machine learning model (e.g., anomaly machine learning model 235 220 of FIG. 2).

At block 625, in response to determining that the anomaly measure satisfies one or more criteria, an alert is output (e.g., alert 130 of FIG. 1).

Figure 7:
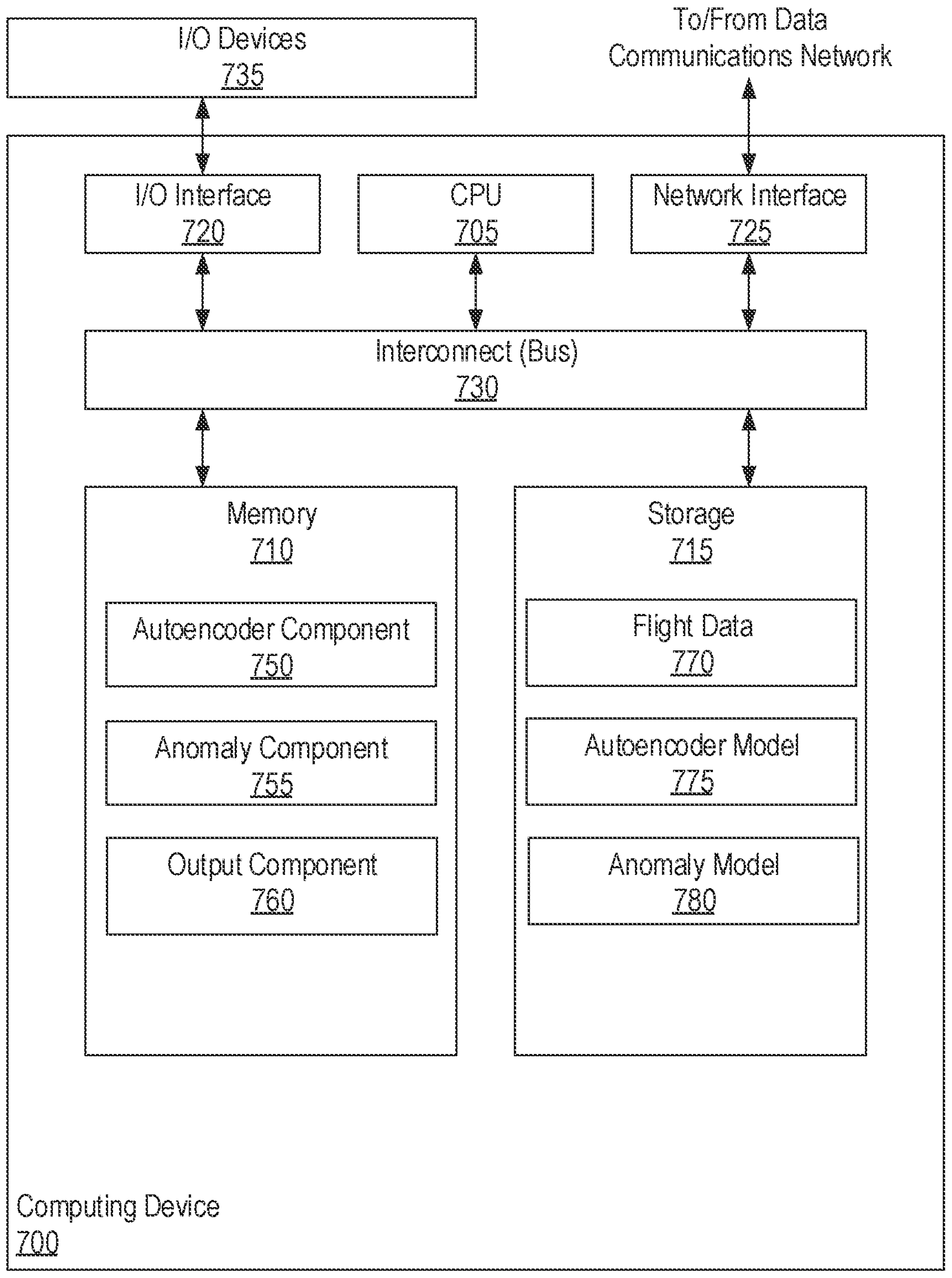
FIG. 7 depicts an example computing device, according to one or more aspects of the present disclosure.

FIG. 7 depicts an example computing device 700, according to one or more aspects of the present disclosure. Although depicted as a physical device, in aspects, the computing device 700 may be implemented using virtual device(s), and/or across a number of devices (e.g., in a cloud environment). In one aspect, the computing device 700 corresponds to a machine learning system, such as the machine learning system 110 of FIG. 1.

As illustrated, the computing device 700 includes a CPU 705, memory 710, storage 715, a network interface 725, and one or more I/O interfaces 720. In the illustrated aspect, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated aspect, the memory 710 includes an autoencoder component 750, an anomaly component 755, and an output component 760, which may perform one or more aspects discussed above. Although depicted as discrete components for conceptual clarity, in aspects, the operations of the depicted components (and others not illustrated) may be combined or distributed across any number of components. Further, although depicted as software residing in memory 710, in aspects, the operations of the depicted components (and others not illustrated) may be implemented using hardware, software, or a combination of hardware and software.

In one aspect, the autoencoder component 750 (which may correspond to the autoencoder component 115 of FIG. 1) is used to train and/or use autoencoder models to generate embeddings, reconstructed flight data, and/or reconstruction errors, as discussed above. The anomaly component 755 (which may correspond to the anomaly component 120 of FIG. 1) may be used to train and/or use anomaly models to generate anomaly measures based on embeddings and/or reconstruction error, as discussed above. The output component 760 (which may correspond to the output component 125 of FIG. 1) may be used to dynamically generate alerts and other actions based on the anomaly measures, as discussed above.

In the illustrated example, the storage 715 includes flight data 770 (which may correspond to the flight data 105 of FIGS. 1 and 2). That is, the flight data 770 may include, for one or more flights, a sequence of data indicating the location and/or movement of each flight over time. As illustrated, the storage 715 further includes an autoencoder model 775 (which may correspond to the encoder 210 and decoder 215 of FIG. 2), as well as one or more anomaly models 780 (which may correspond to the anomaly machine learning model 235 of FIG. 2). Although depicted as residing in storage 715, the flight data 770, autoencoder model 775, and anomaly model 780 may be stored in any suitable location, including memory 710.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

accessing, by a device, a set of flight data for a flight of an aircraft;

generating, by the device, an embedding by processing the set of flight data using an autoencoder machine learning model;

generating, by the device, a reconstruction error based on the embedding using the autoencoder machine learning model;

generating, by the device, an anomaly measure for the set of flight data by processing the embedding and the reconstruction error using a first anomaly machine learning model, to determine a first type of anomaly, and a second anomaly machine learning model to determine a second type of anomaly, wherein the first anomaly machine learning model outputs a first score and wherein the second anomaly machine learning model outputs a second score, wherein the first score, from the first anomaly machine learning model, indicates a probability that the aircraft is the first type of anomaly, wherein the first type of anomaly is a holding pattern, and wherein the second score, from the second anomaly machine learning model, indicates a probability that the aircraft is the second type of anomaly, wherein the second type of anomaly is a rapid descent; and automatically performing, by the device, one or more actions for a resource or service at a destination based on the anomaly measure satisfying one or more criteria.

2. The method of claim 1, wherein the set of flight data comprises a sequence of records, each respective record in the sequence of records comprising data indicating:

a respective longitude of the aircraft, a respective latitude of the aircraft, a respective altitude of the aircraft, and a respective ground speed of the aircraft.

3. The method of claim 2, further comprising augmenting the set of flight data by generating one or more additional records, the augmenting comprising interpolating the data in each record of the sequence of records.

4. The method of claim 1, further comprising:

normalizing the set of flight data based on a coordinate system, wherein an origin location of the flight of the aircraft is normalized to a first defined point in the coordinate system and a destination location of the flight of the aircraft is normalized to a second defined point in the coordinate system.

5. The method of claim 1, wherein:

the autoencoder machine learning model comprises an encoder portion and a decoder portion, and generating the embedding comprises processing the set of flight data using the encoder portion.

6. The method of claim 5, wherein generating the reconstruction error comprises:

generating a reconstructed set of flight data by processing the embedding using the decoder portion; and quantifying differences between the set of flight data and the reconstructed set of flight data.

7. The method of claim 1, wherein the anomaly measure further indicates a probability that the aircraft is in a diversion.

8. The method of claim 1, wherein the autoencoder machine learning model was trained based on training sets of flight data, wherein the training sets of flight data correspond to non-anomalous flights of one or more aircraft.

9. The method of claim 1, wherein the first anomaly machine learning model or the second anomaly machine learning model was trained based on training sets of flight data, wherein the training sets of flight data correspond to both (i) non-anomalous flights of one or more aircraft and (ii) anomalous flights of one or more aircraft.

10. A system, comprising:

a processor;

a memory storage device including instructions that when executed by the processor is configured to:

access a set of flight data for a flight of an aircraft;

generate an embedding by processing the set of flight data using an autoencoder machine learning model;

generate a reconstruction error based on the embedding using the autoencoder machine learning model;

generate an anomaly measure for the set of flight data by processing the embedding and the reconstruction error using an anomaly machine learning model, wherein the anomaly machine learning model includes at least one of:

a first anomaly machine learning model to determine a first type of anomaly, and a second anomaly machine learning model to determine a second type of anomaly, and wherein the first anomaly machine learning model outputs a first score indicating a first probability that the aircraft is a first type of anomaly, and wherein the first type of anomaly is a holding pattern, or wherein the second anomaly machine learning model outputs a second score indicating a second probability the aircraft is the second type of anomaly wherein the second type of anomaly is a rapid descent; and automatically perform one or more actions for a resource or service at a destination based on the anomaly measure satisfying one or more criteria.

11. The system of claim 10, wherein the set of flight data comprises a sequence of records, each respective record in the sequence of records comprising data indicating:

a respective longitude of the aircraft, a respective latitude of the aircraft, a respective altitude of the aircraft, and a respective ground speed of the aircraft.

12. The system of claim 11, wherein the processor is further configured to:

augment the set of flight data by generating one or more additional records, comprising interpolating the data in each record of the sequence of records.

13. The system of claim 10, wherein the processor is further configured to:

normalize the set of flight data based on a coordinate system, wherein an origin location of the flight of the aircraft is normalized to a first defined point in the coordinate system and a destination location of the flight of the aircraft is normalized to a second defined point in the coordinate system.

14. The system of claim 10, wherein the autoencoder machine learning model comprises an encoder portion and a decoder portion, and wherein the processor is further configured to:

process the set of flight data using the encoder portion.

15. The system of claim 14, wherein the processors, when generating the reconstruction error is to:

generate a reconstructed set of flight data by processing the embedding using the decoder portion; and qualify differences between the set of flight data and the reconstructed set of flight data.

16. A computer program product, the computer program product comprising a non-transitory computer-readable storage medium having computer-readable program code embodied therewith, the computer-readable program code executable by one or more computer processors to:

access a set of flight data for a flight of an aircraft;

generate an embedding by processing the set of flight data using an autoencoder machine learning model;

generate a reconstruction error based on the embedding using the autoencoder machine learning model;

generate an anomaly measure for the set of flight data by processing the embedding and the reconstruction error using an anomaly machine learning model, wherein the anomaly machine learning model includes at least one of:

a first anomaly machine learning model to determine a first type of anomaly, and a second anomaly machine learning model to determine a second type of anomaly, and wherein the first anomaly machine learning model outputs a first score that indicates a probability that the aircraft is the first type of anomaly, wherein the first type of anomaly is a holding pattern, and wherein the second anomaly machine learning model outputs a second score that indicates a probability that the aircraft is the second type of anomaly, wherein the second type of anomaly is a rapid descent; and automatically perform one or more actions for a resource or service at a destination based on the anomaly measure satisfying one or more criteria.

17. The computer program product of claim 16, wherein the set of flight data comprises a sequence of records, each respective record in the sequence of records comprising data indicating:

a respective longitude of the aircraft, a respective latitude of the aircraft, a respective altitude of the aircraft, and a respective ground speed of the aircraft, and wherein the computer-readable program code further causes the one or more computer processors to:

augment the set of flight data by generating one or more additional records, the augmenting comprising interpolating the data in each record of the sequence of records.

18. The computer program product of claim 16, wherein the computer-readable program code further causes the one or more computer processors to:

normalize the set of flight data based on a coordinate system, wherein an origin location of the flight of the aircraft is normalized to a first defined point in the coordinate system and a destination location of the flight of the aircraft is normalized to a second defined point in the coordinate system.

19. The computer program product of claim 16, wherein the autoencoder machine learning model comprises an encoder portion and a decoder portion, and wherein the computer-readable program code further causes the one or more computer processors to:

process the set of flight data using the encoder portion.

20. The computer program product of claim 19, wherein the computer-readable program code that causes the one or more computer processors to generate the reconstruction error, cause the one or more processors to:

generate a reconstructed set of flight data by processing the embedding using the decoder portion; and qualify differences between the set of flight data and the reconstructed set of flight data.

* * * * *